Dec. 6, 1927.
N. DE FRANCISCI ET AL
1,651,918
CHEESE CUTTER
Filed April 5, 1927    2 Sheets-Sheet 1
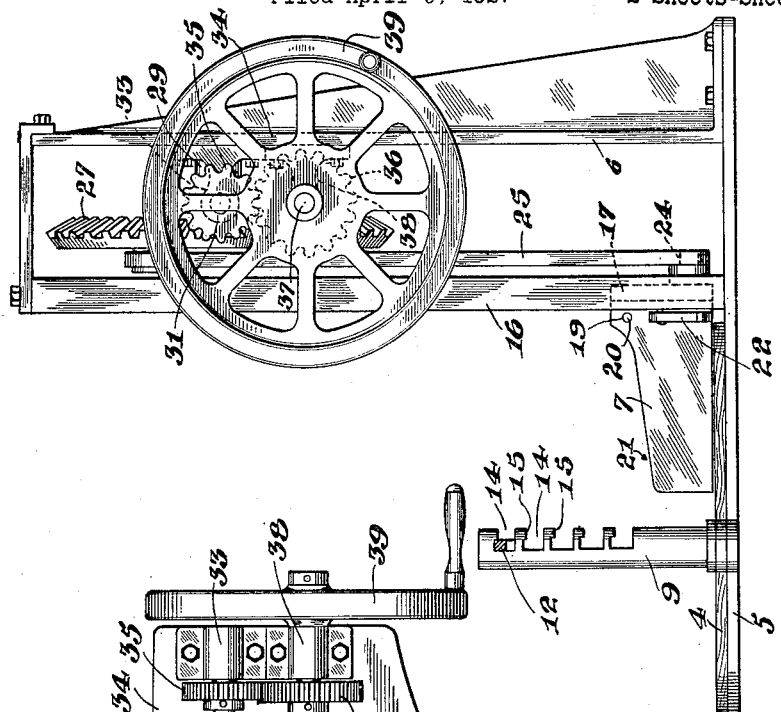
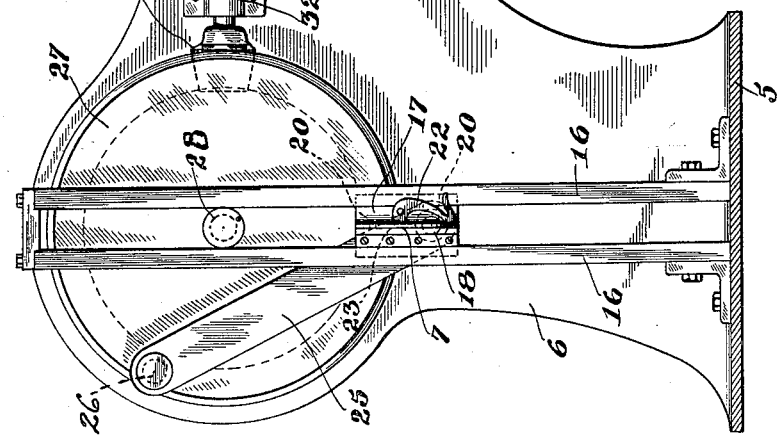
Inventor
Nicholas de Francisci
Emil de Francisci
By Mason Fenwick & Lawrence
Attorneys Dec. 6, 1927.

N. DE FRANCISCI ET AL 1,651,918

CHEESE CUTTER

Filed April 5, 1927

Inventor
Nicholas de Francisci
Emil de Francisci

By Mason Fenwick Lawrence
Attorneys

Patented Dec. 6, 1927.

1,651,918

UNITED STATES PATENT OFFICE.

NICHOLAS DE FRANCISCI AND EMIL DE FRANCISCI, OF NEW YORK, N. Y.

CHEESE CUTTER.

Application filed April 5, 1927. Serial No. 181,229.

Our invention is intended particularly for cutting hard Italian cheeses, the primary object of our invention being to provide an apparatus by which hard cheeses of this nature may be cut at the shop into sectors of any weight and size called for, cleanly, expeditiously and conveniently.

To this end our invention in its entirety comprises a generally circular bed on which the cheese is placed, centered and turned as each sector is cut therefrom, a vertically reciprocating radial knife to cut the cheese on the desired radius, a vertically reciprocating carrier for said knife, means for depressing and elevating said carrier and knife for each cutting operation, and means for holding the cheese in place during the cutting operation and for releasing it so that it may be turned to bring its next radius under the knife.

Our invention also comprises means for attaching the knife to and detaching it from the carrier as well as other new and useful features of construction and arrangement hereinafter described.

In order that our invention may be fully understood, we shall first describe in detail one mode in which we at present prefer to carry the invention into practice and then particularly point out the various features of the invention in the claims.

Reference is to be had to the accompanying drawings forming part of this application, in which like parts are designated by the same numbers in all the figures.

Figure 1 is a side partly sectional elevation of a cheese cutter embodying our invention.

Figure 2 is a front elevation of the same.

Figure 3:
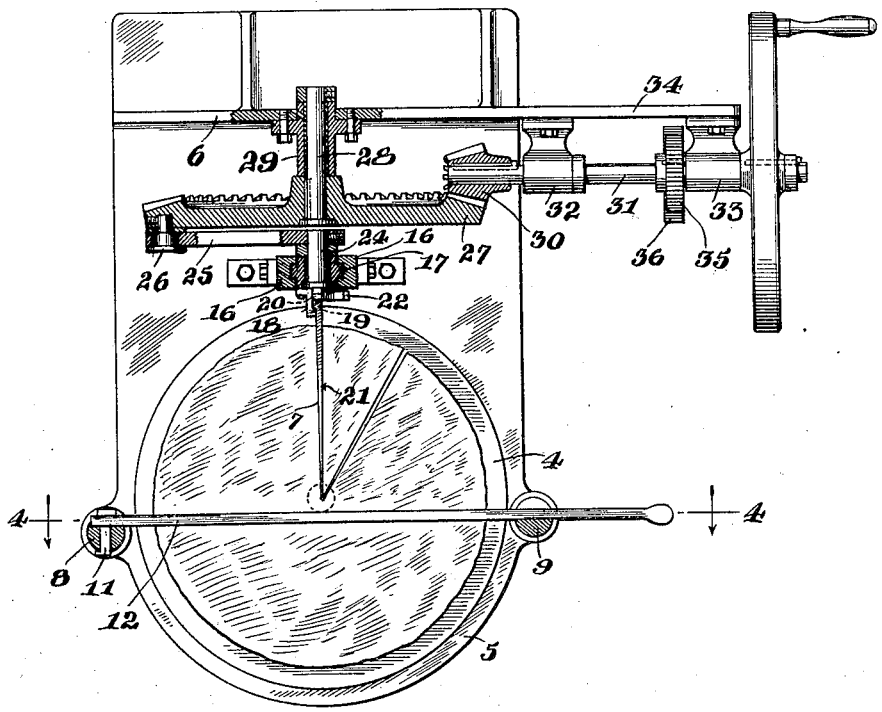
Figure 3 is a plan view of the same.
Figure 4:
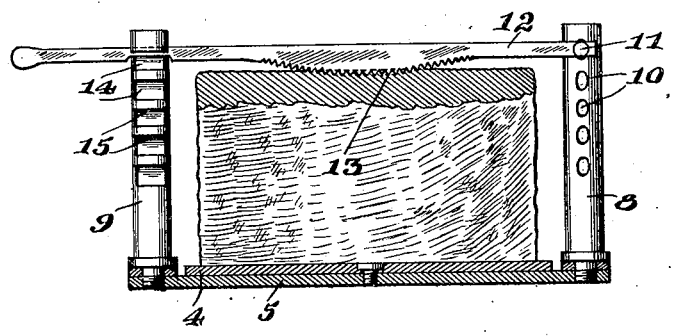
Figure 4 is a sectional elevation on the line 4—4, Figure 3.

In the embodiment of our invention thus illustrated 4 designates the bed of the cutter preferably of wood on which the usually circular cheese, particularly the hard Italian cheese, to be cut is placed and centered.

The bed 4 is preferably made circular, as shown, like the cheese to assist in centering the cheese on the bed.

The wooden bed 4 is fixed on a bed plate 5, on which near the periphery of the bed 4 is erected a rigid standard 6 to support the vertically reciprocating radial cutting knife 7 and its operating mechanism hereinafter described.

On the bed plate 5 near opposite ends of the diameter of the circular bed 4 are also erected two standards 8 and 9 to support the cheese holding mechanism.

The standard 8 is provided with a vertical series of elliptical pivot holes 10 to receive detachably and adjustably a headed pivot 11 fixed on the end of a handle lever 12, which is provided on its under side with teeth or serrations 13, to engage the top of the cheese. The standard 9 is provided with a vertical series of transverse notches 14, having on their upper sides shoulders 15, to receive adjustably and retain releasably the free arm of the handle lever 12.

With this construction the cheese holding lever 12 can be engaged with and pivoted in one of the holes 10 of the standard 8 approximating the height of the cheese, and can then be swung downward until the teeth 13 engage the top of the cheese when the lever can be engaged and temporarily locked in the appropriate one of the shouldered notches 14 on the standard 9.

The cheese will then be securely held in place and ready for cutting on a radius here shown at right angles to the holding lever 12.

The knife supporting standard 6 is provided with opposing vertical guide rails 16, in which is fitted to slide vertically a carrier 17, having a radially projecting plate 18 provided with studs 20 adapted to seat slidably in stud holes 19 formed in knife 21. The knife 21 being placed against the plate 18, with the studs 20 seated in holes 19, is clamped against said plate and held fixedly to the carrier by means of a cam lever 22 pivoted to the carrier 17, and having a cam projection 23 to bear against the knife and bind it to the plate 18.

The knife 21 projects radially over the cheese on the bed 4, so that when it descends it will cut through the circular cheese on a radius thereof, the cheese being then turned on the bed through the required arc, when the knife 21 again descends it will cut from the cheese a sector of the desired size.

To reciprocate the knife 21 vertically, we employ in this instance the following mechanism:

On the knife carrier 17, is fixed a stud or pin 24, on which is pivoted one end of a connecting rod 25, the other end of which is pivoted on a pin 26 fixed eccentrically to a bevel gear 27, fixed on a short shaft 28, turning in a bearing 29 fixed to the standard 6.

The bevel gear 27 engages a bevel pinion 30, fixed on a shaft 31, journaled transversely in bearings 32 and 33 fixed to a lateral extension 34 of the standard 6. On the other end of the shaft 31, is fixed a spur gear 35, engaged by a spur gear 36 fixed on a short shaft 37, journaled in a bearing 38 on the standard extension 34 and on the other end of the short shaft 37 is fixed a heavy hand wheel 39.

Thus by rotating the hand wheel 39 the large bevel gear 27 is rotated so as to reciprocate through the rod 25 the cutting knife 21 vertically.

With this construction and arrangement the cheese can be quickly centered on the bed and clamped in position thereon, the knife caused to descend so as to cut the cheese on the exact radius desired, the cheese released, turned the desired extent and clamped again, and the knife then caused to descend again so as to complete the cutting of the exact sector of cheese called for.

It is evident that many changes may be made in the specific details herein described without departing from the boundaries of the invention as defined by the following claims:

We claim as our invention:

1. A cheese cutter comprising a frame, a bed for the cheese, a pivotal lever for clamping the cheese on the bed, a standard having a vertical series of pivot holes to receive the lever pivot adjustably, a standard having a vertical series of notches to receive and retain the free end of the lever adjustably, a knife arranged radially over the cheese bed, and means for reciprocating the knife vertically.

2. A cheese cutter comprising a frame, a bed plate and bed for the cheese, standards rising from the bed plate, a lever for clamping the cheese on the bed, means for pivoting the lever to one standard, means for locking the lever on the other standard, a knife arranged radially over the cheese bed, and means for reciprocating the knife vertically.

In testimony whereof we affix our signatures.

NICHOLAS DE FRANCISCI.
EMIL DE FRANCISCI.